US008002640B2

(12) United States Patent
Cermak et al.

(10) Patent No.: US 8,002,640 B2
(45) Date of Patent: Aug. 23, 2011

(54) WHEEL HUB/UNIVERSAL JOINT ASSEMBLY WITH END TEETH AND WHEEL BEARING

(75) Inventors: Herbert Cermak, Bessenbach (DE); Michael Zierz, Freiensteinau (DE); Christoph Sieber, Heusenstamm (DE)

(73) Assignee: GKN Driveline Deutschland GmbH, Offenbach (DE)

( * ) Notice: Subject to any disclaimer, the term of this patent is extended or adjusted under 35 U.S.C. 154(b) by 445 days.

(21) Appl. No.: 12/093,448

(22) PCT Filed: Oct. 19, 2006

(86) PCT No.: PCT/EP2006/010072
§ 371 (c)(1),
(2), (4) Date: Oct. 13, 2008

(87) PCT Pub. No.: WO2007/054189
PCT Pub. Date: May 18, 2007

(65) Prior Publication Data
US 2009/0230759 A1  Sep. 17, 2009

(30) Foreign Application Priority Data
Nov. 11, 2005 (DE) .................. 10 2005 054 285

(51) Int. Cl.
 *F16D 3/223* (2011.01)
(52) U.S. Cl. ........................ 464/178; 464/906
(58) Field of Classification Search .............. 464/149, 464/178, 182, 906; 403/364; 384/544, 589
See application file for complete search history.

(56) References Cited

U.S. PATENT DOCUMENTS

| 4,893,960 A | | 1/1990 | Beier et al. | |
| 4,966,473 A | * | 10/1990 | Jacob | 384/544 X |
| 6,113,499 A | * | 9/2000 | Braun et al. | |
| 6,280,336 B1 | | 8/2001 | Sone et al. | |
| 7,621,817 B2 | * | 11/2009 | Cermak | 464/178 |

FOREIGN PATENT DOCUMENTS

| DE | 31 16720 C1 | 4/1981 |
| DE | 3604630 A1 | 2/1986 |
| DE | 3636243 A1 | 10/1986 |
| DE | 10 2005 009 935 A1 | 3/2005 |
| DE | 10 2005 009 938 A1 | 3/2005 |
| DE | 20 2004 020 400 | 7/2005 |

* cited by examiner

*Primary Examiner* — Gregory Binda
(74) *Attorney, Agent, or Firm* — Rader, Fishman & Grauer, PLLC

(57) ABSTRACT

A wheel hub/universal joint assembly having an axis of rotation

A constant velocity universal joint with an outer joint part, an inner joint part, and torque transmitting balls The outer joint part has a first face toothing which engages a second face toothing provided at a collar on a sleeve portion of the wheel. Clamping means axially clamps the wheel hub to the outer joint part 22. The clamping means is axially supported on the wheel hub and the outer joint part 22.

The ratio of the axial length $B_L$ of the wheel bearing 13 and the mean diameter $D_V$ of the face toothing is smaller than 0.63, i.e. $B_L/D_V < 0.63$.

20 Claims, 3 Drawing Sheets

WHEEL HUB/UNIVERSAL JOINT ASSEMBLY WITH END TEETH AND WHEEL BEARING

TECHNICAL FIELD

The invention relates to a wheel hub/universal joint assembly for connecting a wheel-related universal joint of a sideshaft of a motor vehicle to the wheel hub received by a wheel carrier of the vehicle. The wheel hub comprises a sleeve portion for receiving a wheel bearing which, in turn, is held in the wheel carrier, and a wheel flange for bolting on a wheel.

BACKGROUND

From DE 36 36 243 A1 there is known a wheel hub/universal joint assembly wherein the wheel hub comprises a sleeve portion with a beaded collar which axially fixes an inner bearing race of the wheel bearing. At its end facing the constant velocity universal joint, the beaded collar comprises a face toothing which, for torque transmitting purposes, engages a corresponding face toothing of the outer joint part, the purpose being that, independently of the bearing size, it should be possible for the diameter of the face toothings to be adapted to the required torque capacity. To achieve a radially compact and thus lightweight wheel bearing, the wheel bearing with its bearing balls is radially positioned approximately at the level of the balls of the constant velocity universal joint.

SUMMARY

It is an object of the present invention to propose a wheel hub/universal joint assembly which features an improved rotational stiffness and bending stiffness and at the same time good axial clamping conditions.

These and other objectives are achieved by providing a wheel hub/universal joint assembly with an axis of rotation (A), comprising a wheel hub with a wheel flange for connecting a wheel and with a sleeve portion; a double-row wheel bearing for rotatably supporting the wheel hub, having an inner bearing race which is produced separately from the wheel hub and which is axially clamped in by a collar formed at the sleeve portion; a constant velocity universal joint with an outer joint part, an inner joint part and torque transmitting balls; wherein the outer joint part, at its end facing the wheel hub, comprises a first face toothing which, for torque transmitting purposes, engages a second face toothing provided at the collar of the sleeve portion; clamping element for axially clamping the wheel hub to the outer joint part, which clamping element are axially supported on the wheel hub on the one hand and on the outer joint part on the other hand; wherein the ratio of the axial length $B_L$ of the wheel bearing and the mean diameter $D_V$ of the set of end teeth is smaller than 0.63, i.e. $B_L/D_V<0.63$.

One advantage is that, with reference to the constant velocity universal joint as a whole, the wheel bearing is positioned on a large diameter. The larger diameter of the wheel bearing element, the more that the bearing balls can be accommodated around the circumference, which means that, in turn, each bearing ball is subjected to lower forces. The diameter of the bearing ball can be reduced, so that the outer bearing race and the inner bearing race can be thinner in the radial direction. The entire ratio between the axial length of the wheel bearing and the mean diameter of the face toothing is particularly advantageous because, with reference to the mean diameter of the face toothing—with the same or an improved supporting force of the wheel bearing—there is achieved a wheel bearing which, in the axial direction, is relatively short.

The good supporting force of the wheel bearing leads to a longer service life. A further advantage consists in that also the sleeve portion of the wheel, which sleeve portion carries the wheel bearing, comprises a large diameter and thus a high surface inertia moment. Overall, the wheel hub/universal joint assembly features a high torsional stiffness and a high bending strength. The amount of deformation occurring in operation can be reduced, which has an advantageous effect on the noise behavior, and leads to a higher torque transmitting capacity, respectively.

The pitch circle diameter TKD of the wheel bearing is preferably greater than the pitch circle diameter PCD of the set of balls of the joint. Furthermore, according to one embodiment, the outer bearing race with its outer ball grooves is positioned on a greater diameter than a greatest diameter of the outer joint part, which has a positive effect on the stiffness of the assembly. The clamping element can be provided either in the form of a solid bolt or in the form of a hollow bolt which is axially fixed in a central aperture of the outer joint part.

It is advantageous if the ratio of the pitch circle diameter TKD of the wheel bearing and the mean diameter $D_V$ of the face toothing is smaller than 1.26, i.e. $TKD/D_V<1.26$. This ratio represents a characteristic factor for the transmission of torque. With this ratio, the torque is introduced into the wheel hub in the radial direction close to the pitch circle diameter of the wheel bearing, so that there is achieved a high torsional stiffness for the assembly.

Furthermore, it is advantageous if the ratio of the central distance $M_{LV}$ between the wheel bearing and the set of end teeth on the one hand and the axial length $B_L$ of the wheel bearing on the other hand is smaller than 0.67, i.e. $M_{LV}/B_L<0.67$. In this case, too, the joint is connected close to the wheel bearing. This ratio is a measure for the influence of possible production inaccuracies on the bearing of the driveshaft and of the joint respectively.

Furthermore, it is advantageous if the ratio of the central distance $M_{GV}$ between the midplane of the face toothing and the central plane of the constant velocity universal joint on the one hand and the pitch circle diameter PCD of the set of balls of the joint on the other hand is smaller than 0.74, i.e. $M_{GV}/PCD<0.74$. As a result of this measure, the joint is connected close to the pairs of toothings. This ratio is a measure for the influence of possible production inaccuracies on the bearing of the driveshaft and of the joint respectively.

Furthermore, it is advantageous if the ratio of the radial width $B_V$ of the face toothing and the mean diameter $D_V$ of the face toothing is smaller than 0.22, i.e. $B_V/D_V<0.22$.

In this way, pairs of toothings may be achieved which, in the axial direction, are relatively narrow, so that the face toothings carry their loads uniformly along their entire radial extension.

Furthermore, it is advantageous if the ratio between the mean diameter $D_V$ of the face toothing and the inner diameter $D_B$ of the through-aperture is smaller than 1.5, i.e. $D_V/D_B<1.5$. This ratio represents a measure for the introduction of torque from the outer joint part into the wheel hub, with said region effecting a particularly high torsional stiffness.

When using a hollow bolt as a clamping element, it is advantageous if the ratio of the mean diameter $D_V$ of the face toothing on the one hand and the diameter $D_G$ of the thread between the hollow bolt and the outer joint part on the other hand is smaller than 1.6, i.e. $D_V/D_G<1.6$. This ratio represents a measure for the direct connection between the constant velocity universal joint and the wheel hub. In a preferred embodiment, the ratio of the inner diameter $D_B$ of a through-aperture on the one hand and the diameter $D_G$ of the thread between the hollow bolt and the outer joint part is smaller than 1.2, i.e. $D_B/D_G<1.2$.

Furthermore, it is advantageous if the ratio of the distance $M_{LG}$ between the joint centre and the bearing centre on the one hand and the sum of the pitch circle diameter PCD of the set of joint balls and the length of the wheel bearing $B_L$ on the other hand is smaller than 0.7, i.e. $(M_{LG})/(PCD+B_L)<0.7$. In this way there is achieved a short distance between the constant velocity universal joint and the wheel bearing, so that the joint centre is located close to the expansion axis around which the wheel is pivoted during a steering movement.

BRIEF DESCRIPTION OF THE DRAWINGS

Embodiments will be explained below with reference to the drawing wherein.

DETAILED DESCRIPTION

Figure 1:
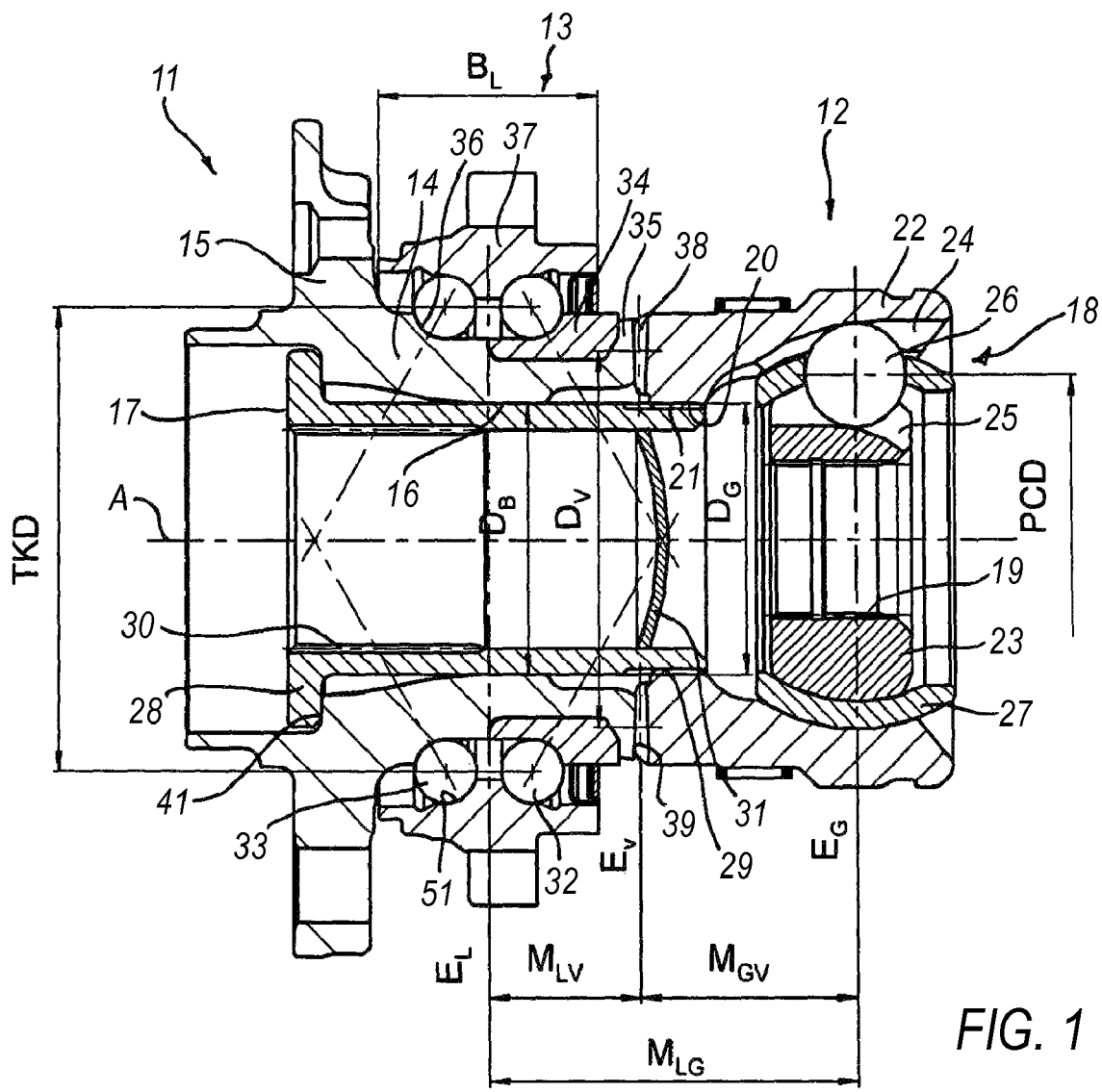
FIG. 1 is a longitudinal section through an wheel hub/universal joint assembly.

FIG. 1 shows a wheel hub/universal joint assembly which comprises a wheel hub 11, a constant velocity universal joint 12 and a wheel bearing 13 as components. The wheel hub 11 comprises a sleeve portion 14 for accommodating the wheel bearing 13 and a wheel flange 15 for bolting on the wheel disc of a wheel (not illustrated). The sleeve portion 14 comprises a through-aperture 16 through which there are passed clamping element 17 for axially clamping the wheel hub 11 to the constant velocity universal joint 12.

The constant velocity universal joint 12 comprises an outer joint part 22 with outer ball tracks 24, an inner joint part 23 with inner ball tracks 25, torque transmitting balls 26 each arranged in outer and inner ball tracks 24, 25 arranged opposite one another to form a pair, as well as a ball cage 27 holding the balls 26 in an angle-bisecting plane. The constant velocity universal joint 12 shown here is provided in the form of a fixed joint with undercut-free curved ball tracks 24, 25, with the ball tracks 24, 25 widening away from the wheel hub 11 towards the first aperture 18. The inner joint part 23 comprises a central bore 19 with longitudinal teeth into which there has to be inserted a side shaft (not illustrated) may be inserted in a rotationally fixed way. The outer joint part 22, furthermore, comprises a second aperture 20 which is arranged opposite the first aperture 18, which faces the wheel hub and which is provided with an inner thread 21 which is engaged by the clamping element 17.

In this embodiment, the clamping element 17 are provided in the form of a hollow bolt and comprise an annular flange 28 which is axially supported on a radial supporting face 41 of the wheel hub 11, as well as an outer thread 29 which is threaded into the inner thread 21 of the outer joint part 22. For threading-in purposes and for axially clamping the wheel hub 11 to the constant velocity universal joint 12, the hollow bolt 17, at the flange end, comprises splines 30 into which it is possible to insert a key (not illustrated) provided with corresponding splines. Relative to the through-aperture 16, the hollow bolt 17 comprises a clearance fit, so that, when carrying out the axial clamping operation, no additional torsional forces—with the exception of the threading forces—can disadvantageously affect the hollow bolt 17. A cover 31 for sealing the constant velocity universal joint 12 relative to the environment is inserted into the inner cross-section of the hollow screw 17 close to the outer thread 29. At the shaft end, the constant velocity universal joint 12 is commonly sealed by a convoluted boot assembly (not illustrated).

The wheel bearing 13 is provided in the form of an angular contact ball bearing and comprises two rows of bearing balls 32, 33 of which the bearing balls 32 facing the joint run in a separate inner bearing race 34 which is axially secured by an outwardly formed beaded collar 35 of the sleeve portion 14. The bearing balls 33 at the wheel hub end run in an inner bearing race 36 which is formed on an outer face of the wheel hub 11. Furthermore, the wheel bearing 13 comprises a common outer bearing race 37 which accommodates both rows of bearing balls 32, 33 and may be inserted into a wheel carrier (not illustrated). It can be seen that the wheel bearing 13 comprises an O-configuration which satisfactorily supports bending moments acting on the wheel hub 11.

For torque transmitting purposes between the constant velocity universal joint 12 and the wheel hub 11, the outer joint part 22, on an end face surrounding the outside of the aperture 20, comprises a first face toothing 38 which, under axial pretension, engages a corresponding second end toothing 39 formed on the beaded collar 39 of the sleeve portion 14. The hollow bolt 17 serves axial pretensioning purposes. The face toothings 38, 39 will be described in greater detail below.

FIG. 1 contains the characteristic parameters of the inventive wheel hub/universal joint assembly, with the abbreviations as used meaning the following:

PCD pitch circle diameter of the set of joint balls when the joint is not articulated;
TKD pitch circle diameter of the wheel bearing;
$B_L$ width of wheel bearing;
$B_V$ radial extension of the face toothing;
$D_V$ mean diameter of face toothing;
$D_B$ bore diameter of through-aperture;
$D_G$ thread diameter;
$M_{LG}$ distance between the centre plane ($E_L$) of the wheel bearing and the joint centre plane ($E_G$);
$M_{LV}$ distance between the centre plane ($E_L$) of the wheel bearing and the centre plane ($E_V$) of the face toothing;
$M_{GV}$ distance between the centre plane ($E_V$) of the face toothing and the joint centre plane ($E_G$).

It can be seen that the pitch circle diameter TKD of the wheel bearing 13 is clearly greater than the pitch circle PCD of the set of joint balls. Furthermore, the outer bearing race 37 with its outer ball grooves S1 is positioned on a greater diameter than the greatest diameter of the outer joint part 22. Overall, the wheel bearing 13, with reference to the constant velocity universal joint 12, is positioned on a large diameter, so that also the sleeve portion 14 of the wheel hub 11, which sleeve portion carries the wheel bearing 13, comprises a large diameter. As far as the sleeve portion 14 is concerned, this results in a high surface inertia moment which leads to a high torsional stiffness and a high bending stiffness of the entire assembly, which, in turn, leads to a reduction in the amount of deformation occurring under operational conditions, and this has an advantageous effect on the noise behaviour and means that higher torque values can be transmitted. The particularly advantageous sizes of the inventive wheel hub/universal joint assembly and their advantages have already been mentioned in the above description and in the claims to which reference is hereby made.

Figure 2:
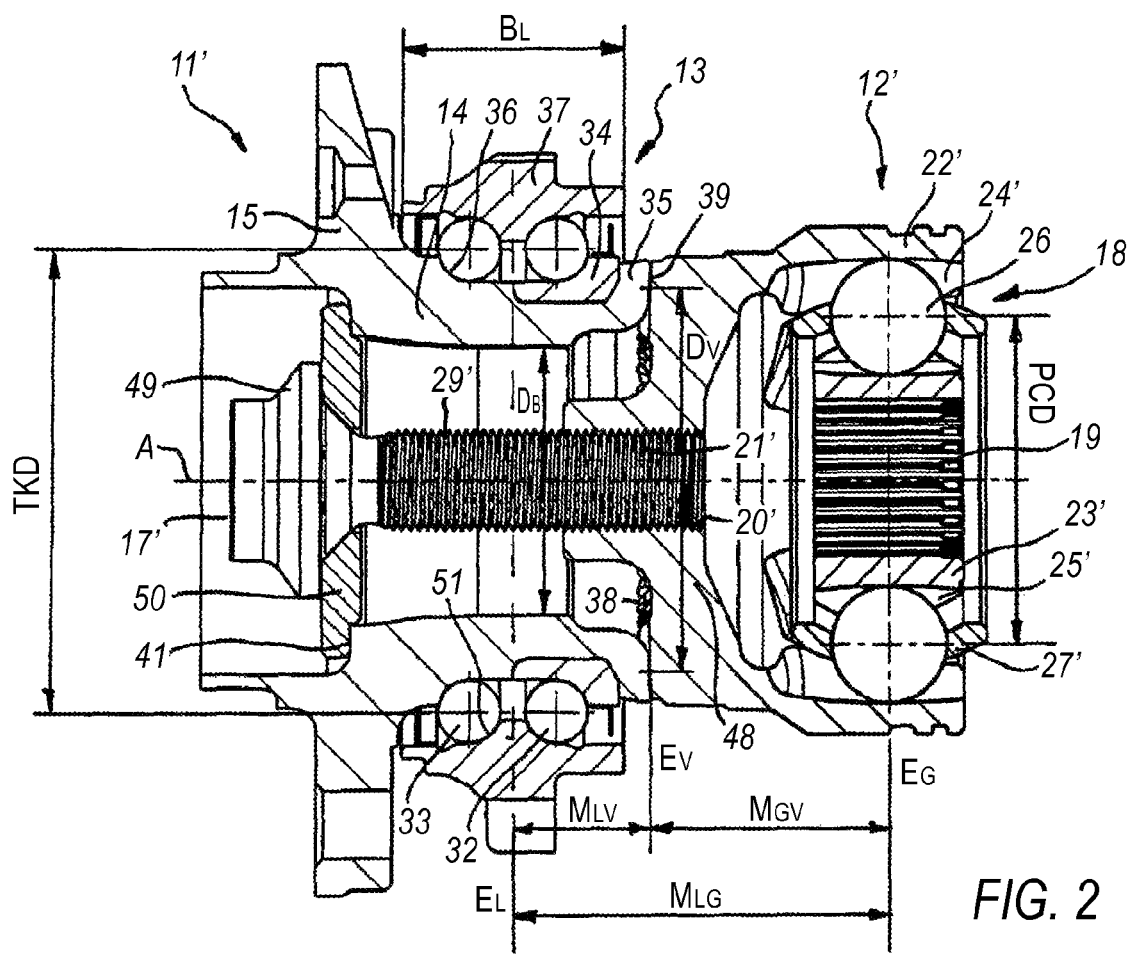
FIG. 2 is a longitudinal section through an alternate wheel hub/universal joint assembly.

FIG. 2 shows a wheel hub/universal joint assembly in a another embodiment which largely corresponds to the assembly according to FIG. 1. Therefore, reference is made to the above description; identical components have been given the same reference numbers and the reference numbers of modified components have been provided with an apostrophe. Below, there will follow a description of the differences. The present constant velocity universal joint is of the type which comprises ball tracks 24' intersecting the axis of rotation A. A further difference relative to the above embodiment refers to the way in which the constant velocity joint 12' is axially clamped to the wheel hub 11'. In the present embodiment, the outer joint part 24', at the wheel hub end, comprises a base 48 with a central aperture 20' with an inner thread 21'. The clamping element 17' are provided in the form of a bolt which, by means of its outer thread 29', is threaded into the inner thread 21' of the outer joint part 24'. The bolt 17', at the wheel hub end, is axially supported by means of its head 49 against a clamping disc 50 which, in turn is supported against the radial supporting face 41 of the wheel hub 11'. Otherwise, the preferred conditions of the illustrated parameters—with the exception of the parameters concerning the hollow bolt—correspond to the above-mentioned conditions, so that the same advantages are achieved for the present wheel hub/universal joint assembly.

Figure 3A:
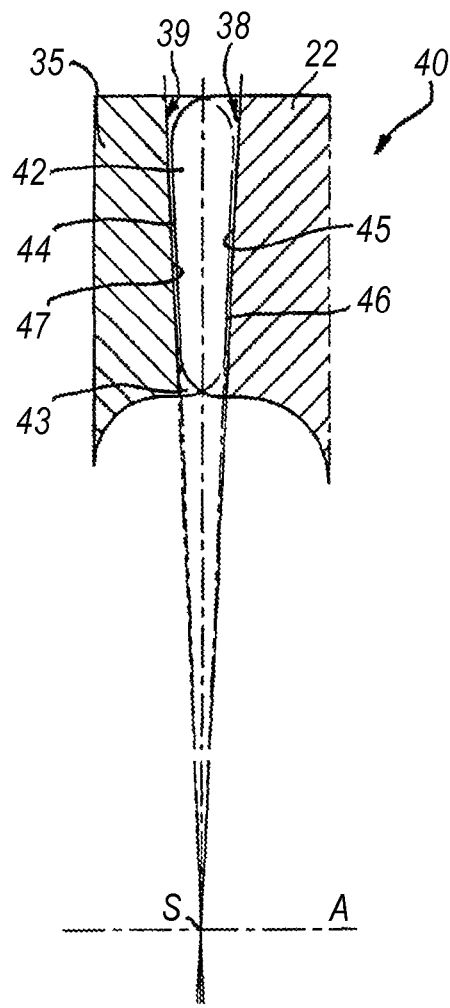
FIG. 3 is half a longitudinal section through the pair of toothings between the outer joint part and the wheel hub of FIGS. 1 and 2 in the form of a detail
  a) in an unclamped condition,
  b) in a clamped condition.
Figure 3B:
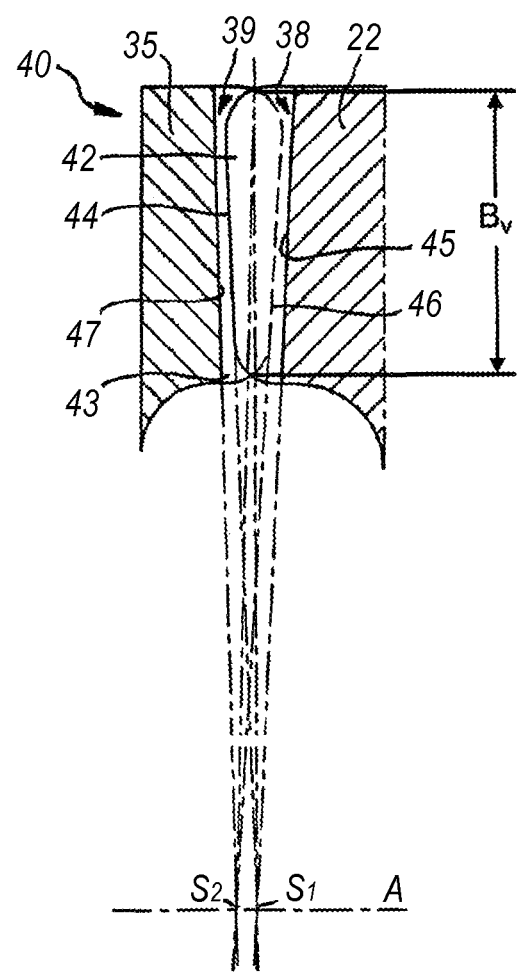

With reference to FIG. 3, there will follow below a description of the pair of toothings 40 of the two above-mentioned wheel hub/joint assemblies, which pair of toothings 40 is formed by the two face toothings 38, 39. The teeth 42 of the first face toothing 38 which, below will be referred to as first teeth, and the teeth 43 of the second face toothing 39 which, below will be referred to as second teeth, extend radially relative to the axis of rotation A. The face toothings 38, 39 are designed in such a way that the first and second teeth 42, 43, while the assembly is being clamped together, initially contact one another on the radial outside and, as the clamping process progresses, also come into contact with one another on the radial inside. FIG. 3a) shows that the tooth tip lines 44 and the tooth root lines 45 of the first teeth 43 intersect one another in a first point of intersection S1 on the axis of rotation A and that the tooth tip lines 46 and the tooth root lines 47 of the second teeth 43 intersect one another in a second point of intersection S2 on the axis of rotation A. At the start of the clamping process which is shown in FIG. 3a), the two points of intersection S1, S2 are positioned at an axial distance from one another which distance decreases as the clamping process progresses. FIG. 3b) shows the pairs of toothings 40 in a fully axially clamped condition. It can be seen that the tooth tip lines 44 of the first face toothing 38 now extend parallel to the tooth root lines 47 of the second face toothing 39 and that the tooth root lines 45 of the first face toothing 38 now extend parallel to the tooth tip lines 46 of the second face toothing 39. The advantage of the above embodiment is that, in their axially clamped conditions, the first and the second teeth 42, 43 carry their loads uniformly along their entire length. This results in a particularly high torsional stiffness and bending stiffness between the constant velocity universal joint 12 and the wheel hub 11.

The wheel hub/universal joint assembly disclosed herein features an improved rotational stiffness and bending stiffness and at the same time good axial clamping conditions. The wheel hub/universal joint assembly with an axis of rotation (A), comprises a wheel hub with a wheel flange for connecting a wheel and with a sleeve portion; a double-row wheel bearing for rotatably supporting the wheel hub, having an inner bearing race which is produced separately from the wheel hub and which is axially clamped in by a collar formed at the sleeve portion; a constant velocity universal joint with an outer joint part, an inner joint part and torque transmitting balls; wherein the outer joint part, at its end facing the wheel hub, comprises a first face toothing which, for torque transmitting purposes, engages a second face toothing provided at the collar of the sleeve portion; clamping element for axially clamping the wheel hub to the outer joint part, which clamping element are axially supported on the wheel hub on the one hand and on the outer joint part on the other hand; wherein the ratio of the axial length $B_L$ of the wheel bearing and the mean diameter $D_V$ of the set of end teeth is smaller than 0.63, i.e. $B_L/D_V<0.63$.

One advantage of the proposed assembly is that, with reference to the constant velocity universal joint as a whole, the wheel bearing is positioned on a large diameter. The larger diameter of the wheel bearing element, the more that the bearing balls can be accommodated around the circumference, which means that, in turn, each bearing ball is subjected to lower forces. The diameter of the bearing ball can be reduced so that the outer bearing race and the inner bearing race can be thinner in the radial direction. The entire ratio between the axial length of the wheel bearing and the mean diameter of the face toothing is particularly advantageous because, with reference to the mean diameter of the face toothing—with the same or an improved supporting force of the wheel bearing—there is achieved a wheel bearing which, in the axial direction, is relatively short. The good supporting force of the wheel bearing leads to a longer service life. A further advantage consists in that also the sleeve portion of the wheel, which sleeve portion carries the wheel bearing, comprises a large diameter and thus a high surface inertia moment. Overall, the wheel hub/universal joint assembly features a high torsional stiffness and a high bending strength. The amount of deformation occurring in operation can be reduced, which has an advantageous effect on the noise behavior, and leads to a higher torque transmitting capacity, respectively.

The pitch circle diameter TKD of the wheel bearing is preferably greater than the pitch circle diameter PCD of the set of balls of the joint. Furthermore, according to one embodiment, the outer bearing race with its outer ball grooves is positioned on a greater diameter than a greatest diameter of the outer joint part, which has a positive effect on the stiffness of the assembly. The clamping element can be provided either in the form of a solid bolt or in the form of a hollow bolt which is axially fixed in a central aperture of the outer joint part.

It is advantageous if the ratio of the pitch circle diameter TKD of the wheel bearing and the mean diameter $D_V$ of the face toothing is smaller than 1.26, i.e. $TKD/D_V<1.26$. This ratio represents a characteristic factor for the transmission of torque. With this ratio, the torque is introduced into the wheel hub in the radial direction close to the pitch circle diameter of the wheel bearing, so that there is achieved a high torsional stiffness for the assembly.

Furthermore, it is advantageous if the ratio of the central distance $M_{LV}$ between the wheel bearing and the set of end teeth on the one hand and the axial length $B_L$ of the wheel bearing on the other hand is smaller than 0.67, i.e. $M_{LV}/B_L<0.67$. In this case, too, the joint is connected close to the wheel bearing. This ratio is a measure for the influence of possible production inaccuracies on the bearing of the driveshaft and of the joint respectively.

Furthermore, it is advantageous if the ratio of the central distance $M_{GV}$ between the midplane of the face toothing and the central plane of the constant velocity universal joint on the one hand and the pitch circle diameter PCD of the set of balls of the joint on the other hand is smaller than 0.74, i.e. $M_{GV}/PCD<0.74$. As a result of this measure, the joint is connected close to the pairs of toothings. This ratio is a measure for the influence of possible production inaccuracies on the bearing of the driveshaft and of the joint respectively. Furthermore, it is advantageous if the ratio of the radial width $B_V$ of the face toothing and the mean diameter $D_V$ of the face toothing is smaller than 0.22, i.e. $B_V/D_V<0.22$.

In this way, pairs of toothings may be achieved which, in the axial direction, are relatively narrow, so that the face toothings carry their loads uniformly along their entire radial extension. Furthermore, it is advantageous if the ratio between the mean diameter $D_V$ of the face toothing and the inner diameter $D_B$ of the through-aperture is smaller than 1.5, i.e. $D_V/D_B<1.5$. This ratio represents a measure for the introduction of torque from the outer joint part into the wheel hub, with said region effecting a particularly high torsional stiffness.

When using a hollow bolt as a clamping element, it is advantageous if the ratio of the mean diameter $D_V$ of the face toothing on the one hand and the diameter $D_G$ of the thread between the hollow bolt and the outer joint part on the other hand is smaller than 1.6, i.e. $D_V/D_G<1.6$. This ratio represents a measure for the direct connection between the constant velocity universal joint and the wheel hub. In one embodiment, the ratio of the inner diameter $D_B$ of a through-aperture on the one hand and the diameter $D_G$ of the thread between the hollow bolt and the outer joint part is smaller than 1.2, i.e. $D_B/D_G<1.2$.

Furthermore, it is advantageous if the ratio of the distance $M_{LG}$ between the joint centre and the bearing centre on the one hand and the sum of the pitch circle diameter PCD of the set of joint balls and the length of the wheel bearing $B_L$ on the other hand is smaller than 0.7, i.e. $(M_{LG})/(PCD+B_L)<0.7$. In this way there is achieved a short distance between the constant velocity universal joint and the wheel bearing, so that the joint centre is located close to the expansion axis around which the wheel is pivoted during a steering movement.

The invention claimed is:

1. A wheel hub/universal joint assembly with an axis of rotation (A), comprising:
   a wheel hub with a wheel flange for connecting a wheel and with a sleeve portion;
   a double-row wheel bearing for rotatably supporting said wheel hub, having an inner bearing race which is produced separately from said wheel hub and which is axially clamped in by a collar formed at said sleeve portion;
   a constant velocity universal joint with an outer joint part, an inner joint part and torque transmitting balls;
   wherein said outer joint part, at its end facing said wheel hub, comprises a first face toothing which, for torque transmitting purposes, engages a second face toothing provided at said collar of said sleeve portion;
   a clamping element for axially clamping said wheel hub to said outer joint part, which clamping element is axially supported on said wheel hub and on said outer joint part;
   wherein the ratio of an axial length $B_L$ of said wheel bearing and a mean diameter $D_V$ of said first and second face toothing is smaller than 0.63 ($B_L/D_V<0.63$); and
   wherein the ratio of a pitch circle diameter TKD of said wheel bearing and the mean diameter $D_V$ of said first and second face toothing is smaller than 1.26 (TKD/$D_V<1.26$).

2. A wheel hub/universal joint assembly according to claim 1, wherein said wheel bearing comprises bearing balls which are positioned on said pitch circle diameter TKD, wherein said pitch circle diameter TKD is greater than said pitch circle diameter PCD of said torque transmitting balls of said constant velocity universal joint.

3. A wheel hub/universal joint assembly according to claim 1, wherein said wheel bearing comprises an outer bearing race with outer ball grooves, wherein a greatest diameter of the outer ball grooves is greater than a greatest diameter of said outer joint part.

4. A wheel hub/universal joint assembly according to claim 1 wherein the ratio of the central distance $M_{LV}$ between said wheel bearing and said first and second face toothing and the axial length $B_L$ of said wheel bearing is smaller than 0.67 ($M_{LV}/B_L<0.67$).

5. A wheel hub/universal joint assembly according to claim 1, wherein the ratio of the central distance $M_{GV}$ between said first and second face toothing and said constant velocity universal joint and the pitch circle diameter PCD of said torque transmitting balls is smaller than 0.74 ($M_{GV}/PCD<0.74$).

6. A wheel hub/universal joint assembly according to claim 1, wherein the ratio of the radial width $B_V$ of said first and second face toothing and the mean diameter $D_V$ of the said first and second face toothing is smaller than 0.22 ($B_V/D_V<0.22$).

7. A wheel hub/universal joint assembly according to claim 1, wherein sleeve portion comprises an inner diameter $D_B$, wherein the ratio of the mean diameter $D_V$ of said first and second face toothing and the inner diameter $D_B$ of said sleeve portion is smaller than 1.5 ($D_V/D_B<1.5$).

8. A wheel hub/universal joint assembly according to claim 1, wherein said clamping element is provided in the form of a solid bolt which is axially fixed in a central aperture of said outer joint part.

9. A wheel hub/universal joint assembly according to claim 1, wherein said clamping element is provided in the form of a hollow bolt which is axially fixed in a central aperture of said outer joint part.

10. A wheel hub/universal joint assembly according to claim 9, wherein the ratio of the mean diameter $D_V$ of said first and second face toothing and the diameter $D_G$ of a thread between said hollow bolt and the outer joint part is smaller than 1.6 ($D_V/D_G<1.6$).

11. A wheel hub/universal joint assembly according to claim 9, wherein the ratio of the inner diameter $D_B$ of a through-aperture of said sleeve portion and the diameter $D_G$ of a thread between said hollow bolt and said outer joint part is smaller than 1.2 ($D_B/D_G<1.2$).

12. A wheel hub/universal joint according to claim 11, wherein the ratio of a distance $M_{LG}$, between a joint centre of said constant velocity universal joint and a bearing centre of said double-row wheel bearing, and the sum of the pitch circle diameter PCD of said torque transmission balls and a length $B_L$ of said wheel bearing is smaller than 0.7 (($M_{LG})/(PCD+B_L)<0.7$).

13. A wheel hub/universal joint assembly with an axis of rotation (A), comprising:
   a wheel hub with a wheel flange and a sleeve portion, said sleeve portion having an inner diameter $D_B$;
   a double-row wheel bearing for rotatably supporting said wheel hub, said wheel bearing comprising an inner bearing race which is produced separately from said wheel hub and which is axially clamped in by a collar formed at said sleeve portion of said wheel hub, said wheel bearing further comprising a pitch circle diameter TKD and an axial length $B_L$;
   a constant velocity universal joint with an outer joint part, an inner joint part, and torque transmitting balls, said torque transmitting balls having a pitch circle diameter PCD;
   wherein said outer joint part, at an end facing said wheel hub, comprises a first face toothing engaging a second face toothing on said collar of said sleeve portion, said first and second face toothing having a mean diameter $D_V$, a radial width $B_V$, a central distance $M_{GV}$ from said constant velocity universal joint, and a central distance $M_W$ from said wheel bearing;

a clamping element clamping said wheel hub to said outer joint part, said clamping element axially supported on said wheel hub; wherein the ratio of said axial length $B_L$ and said mean diameter $D_V$ is smaller than 0.63 ($B_L/D_V<0.63$); and wherein said clamping element comprises a hollow bolt.

14. A wheel hub/universal joint assembly as described in claim 13, further comprising:

a thread formed on said clamping element having a diameter $D_G$;

wherein said outer joint part includes a central aperture; and wherein a distance $M_{LG}$ is defined between a center of said constant velocity universal joint and a center of said wheel bearing.

15. A wheel hub/universal joint assembly as described in claim 13, wherein said pitch circle diameter TKD is greater than said pitch circle diameter PCD.

16. A wheel hub/universal joint assembly as described in claim 13, wherein the ratio of said pitch circle diameter TKD to said mean diameter $D_V$ is smaller than 1.26 (TKD/$D_V<1.26$).

17. A wheel hub/universal joint assembly as described in claim 13, further comprising:

a central distance $M_{LV}$ between said wheel bearing and said first and second face toothing, the ratio of said central distance $M_{LV}$ to said axial length $B_L$ is smaller than 0.67 ($M_{LV}/B_L<0.67$).

18. A wheel hub/universal joint assembly as described in claim 13, wherein the ratio of said central distance $M_{GV}$ to said pitch circle diameter PCD is smaller than 0.74 ($M_{GV}/PCD<0.74$).

19. A wheel hub/universal joint assembly as described in claim 13, wherein said sleeve portion comprises an inner diameter $D_B$;

wherein the ratio of said mean diameter $D_V$ to said inner diameter $D_B$ is smaller than 1.5 ($D_V/D_B<1.5$).

20. A wheel hub/universal joint assembly with an axis of rotation (A), comprising:

a wheel hub with a wheel flange and a sleeve portion, said sleeve portion having an inner diameter $D_B$;

a double-row wheel bearing for rotatably supporting said wheel hub, said wheel bearing comprising an inner bearing race which is produced separately from said wheel hub and which is axially clamped in by a collar formed at said sleeve portion of said wheel hub, said wheel bearing further comprising a pitch circle diameter TKD and an axial length $B_L$;

a constant velocity universal joint with an outer joint part, an inner joint part, and torque transmitting balls, said torque transmitting balls having a pitch circle diameter PCD;

wherein said outer joint part, at an end facing said wheel hub, comprises a first face toothing engaging a second face toothing on said collar of said sleeve portion, said first and second face toothing having a mean diameter $D_V$, a radial width $B_V$, a central distance $M_{GV}$ from said constant velocity universal joint, and a central distance $M_W$ from said wheel bearing;

a clamping element clamping said wheel hub to said outer joint part, said clamping element axially supported on said wheel hub; wherein the ratio of said axial length $B_L$ and said mean diameter $D_V$ is smaller than 0.63 ($B_L/D_V<0.63$); and wherein said clamping element comprises a solid bolt.

* * * * *